(12) United States Patent
Ahmed (10) Patent No.: US 11,599,684 B2
(45) Date of Patent: Mar. 7, 2023

(54) SYSTEM AND METHOD OF DIGITAL CONTINUITY TAMPER DETECTION

(71) Applicant: Silicon Laboratories Inc., Austin, TX (US)

(72) Inventor: Sebastian Ahmed, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 153 days.

(21) Appl. No.: 17/100,329

(22) Filed: Nov. 20, 2020

(65) Prior Publication Data

US 2022/0075906 A1 Mar. 10, 2022

Related U.S. Application Data (60) Provisional application No. 63/074,566, filed on Sep. 4, 2020.

(51) Int. Cl.
*G06F 21/72* (2013.01)
*G06F 21/87* (2013.01)

(52) U.S. Cl.
CPC .............. *G06F 21/87* (2013.01); *G06F 21/72* (2013.01); *G06F 2221/0797* (2013.01)

(58) Field of Classification Search
CPC .......... G06F 21/86; G06F 21/87; G06F 21/72; G06F 2221/0797; H04L 63/1441
See application file for complete search history.

(56) References Cited

U.S. PATENT DOCUMENTS

| | | | | |
|---|---|---|---|---|
| 7,752,407 | B1 * | 7/2010 | Langhammer | G06F 21/81 711/163 |
| 7,992,009 | B2 * | 8/2011 | Seo | G11C 16/22 713/193 |
| 9,799,180 | B1 * | 10/2017 | Rezayee | G07F 7/1008 |
| 2005/0039040 | A1 * | 2/2005 | Ransom | H04L 63/0272 700/286 |
| 2009/0085610 | A1 * | 4/2009 | Westwick | H03K 5/24 327/68 |
| 2013/0312122 | A1 * | 11/2013 | Arora | G06F 21/755 726/34 |

(Continued)

FOREIGN PATENT DOCUMENTS

CN 114139145 * 4/2022 ............. G06F 13/00

*Primary Examiner* — Lizbeth Torres-Diaz
(74) *Attorney, Agent, or Firm* — Gary Stanford; Huffman Law Group, PC (57) ABSTRACT

An integrated circuit including an input terminal and an output terminal, signal generator circuitry that generates a pseudo-random digital signal provided at the output terminal, and comparator circuitry that compares an input signal received via the input terminal with the pseudo-random digital signal for providing a tamper detection signal indicative thereof. The signal generator circuitry may be a pseudo-random binary sequence generator or may be a linear-feedback shift register with software triggered reloading. The comparator circuitry may include a Boolean logic exclusive-OR gate for comparing the output and input signals. A method of detecting tampering including generating and providing a pseudo-random digital signal at an output terminal and comparing an input signal received via an input terminal with the pseudo-random digital signal for providing a tamper detection signal indicative thereof.

20 Claims, 5 Drawing Sheets

(56) References Cited

U.S. PATENT DOCUMENTS

2016/0026829 A1\* 1/2016 Brocker ................. G06F 21/87
                                                                726/34
2017/0005646 A1\* 1/2017 Hargreaves ............... G06F 3/00
2022/0075906 A1\* 3/2022 Ahmed .................. G06F 21/86

\* cited by examiner

SYSTEM AND METHOD OF DIGITAL CONTINUITY TAMPER DETECTION

CROSS REFERENCE TO RELATED APPLICATION(S)

This application claims the benefit of U.S. Provisional Application Ser. No. 63/074,566, filed on Sep. 4, 2020, which is hereby incorporated by reference in its entirety for all intents and purposes; this application is related to U.S. Non-provisional application Ser. No. 17/100,286, entitled "SYSTEM AND METHOD OF LOW POWER SWITCH STATE DETECTION," which is filed concurrently herewith.

BACKGROUND OF THE INVENTION

Field of the Invention

The present invention relates in general to tamper detection, and more particularly to a system and method of digital continuity tamper detection.

Description of the Related Art

It may be desired to detect tampering of an electronic system or device intended for access only by authorized personnel. Examples include metering systems, security systems, security panels, secure computer systems, point-of-sale (POS) devices, etc. The system may include an enclosure or barrier or the like configured to prevent unauthorized access to sensitive electronic circuitry, but such methods are not tamper-proof and may often be overcome or otherwise compromised.

SUMMARY OF THE INVENTION

An integrated circuit according to one embodiment includes an input terminal and an output terminal, signal generator circuitry that generates a pseudo-random digital signal provided at the output terminal, and comparator circuitry that compares an input signal received via the input terminal with the pseudo-random digital signal for providing a tamper detection signal indicative thereof. The signal generator circuitry may be a pseudo-random binary sequence generator or may be a linear-feedback shift register with software triggered reloading or other types of pseudo-random generators. The pseudo-random digital signal may be a digital signal with pseudo-random delays between pulses.

The comparator circuitry may include a Boolean logic exclusive-OR gate having a first input receiving the pseudo-random digital signal, having a second input receiving the input signal, and having an output providing the detection signal.

The integrated circuit may further include buffer circuitry and filter circuitry. The comparator circuitry may include a Boolean logic exclusive-OR gate having a first input receiving the pseudo-random digital signal, having a second input receiving the filtered input signal, and having an output providing a comparison signal, and a flip-flop having an input receiving the comparison signal and having an output providing a tamper detection signal. The delay circuitry may have an input receiving the pseudo-random digital signal provided by the signal generator circuitry and an output providing a delayed pseudo-random digital signal to the exclusive-OR gate, where the delay circuitry inserts a delay representing a delay from the input of the buffer circuitry to the output of the filter circuitry, and where the flip-flop is clocked by a delay clock. The integrated circuit may include control circuitry that measures a delay between the output of the signal generator circuitry and the output of the filter circuitry and that programs the delay circuitry accordingly. The integrated circuit may include clock circuitry that provides the delay clock that is delayed by the measured delay.

The integrated circuit may further include interrupt circuitry that provides an interrupt when the tamper detection signal is provided, and processing circuitry that performs correction action in response to the interrupt.

A method of detecting tampering according to one embodiment includes generating and providing a pseudo-random digital signal at an output terminal, and comparing an input signal received via an input terminal with the pseudo-random digital signal for providing a tamper detection signal indicative thereof.

The method may include providing a pseudo-random binary sequence. The method may include software trigger reloading of a linear-feedback shift register. The method may include providing a digital signal with pseudo-random delays between pulses.

The method may include performing an exclusive-OR Boolean function between the pseudo-random digital signal and the input signal and providing a comparison signal. The method may include buffering the pseudo-random digital signal provided by the signal generator circuitry and providing a corresponding buffered pseudo-random digital signal at the output terminal, filtering the input signal and providing a filtered input signal, performing an exclusive-OR Boolean function between the pseudo-random digital signal and the filtered input signal and providing a comparison signal, and latching the comparison signal for providing the tamper detection signal. The method may include delaying the pseudo-random digital signal and providing a delayed pseudo-random digital signal, and performing an exclusive-OR Boolean function between the delayed pseudo-random digital signal and the filtered input signal. The method may include measuring a delay between the pseudo-random digital signal and the filtered input signal and programming the delay circuitry accordingly. The method may include delaying the latching of the comparison signal by the measured delay.

The method may include providing an interrupt when the tamper detection signal is provided, and performing correction action in response to the interrupt.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
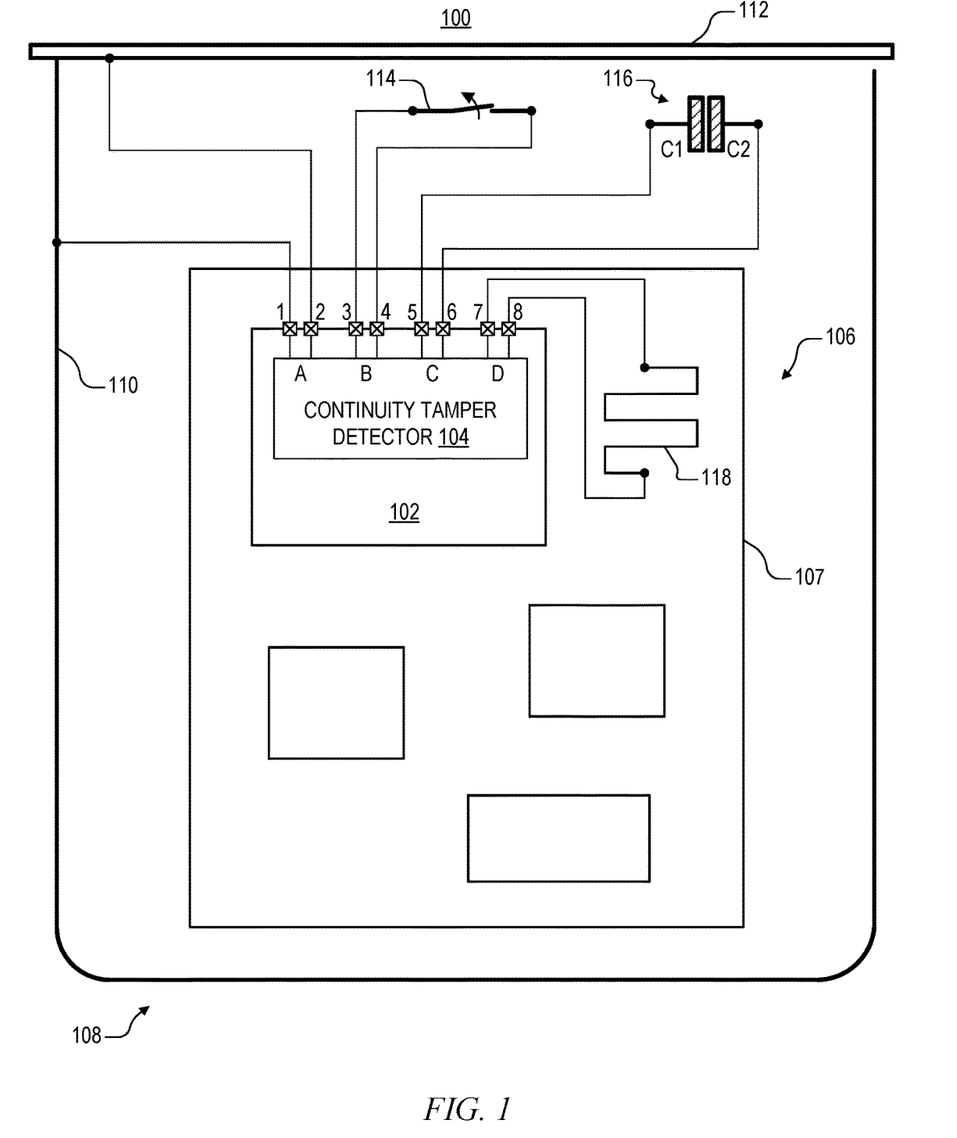
FIG. 1 is a simplified block diagram of electronic system incorporating a semiconductor device or integrated circuit (IC) which further integrates a continuity tamper detector implemented according to an embodiment of the present disclosure.

FIG. 1 is a simplified block diagram of electronic system 100 incorporating a semiconductor device or integrated circuit (IC) 102 which further integrates a continuity tamper detector 104 implemented according to an embodiment of the present disclosure. The IC 102 is shown as part of an electronic circuit 106 intended for limited access. The electronic circuit 106 may include or may be completely or partially implemented on a printed circuit board (PCB) 107 or the like upon which the IC 102 is mounted. Additional semiconductor devices, ICs, and other electronic circuitry and devices may be mounted on the PCB 107 and coupled together via electrical wires, conductors, and traces and the like as understood by those of ordinary skill in the art. The electronic system 100 may be, for example, a metering system, a security system, a security panel, a secure computer system, a point-of-sale (POS) device, etc.

In the illustrated embodiment, the electronic circuit 106 is contained within an enclosure 108 that may be configured to protect or isolate the electronic circuit 106 and to prevent unauthorized access. The enclosure 108 may be tamper resistant and implemented or configured as a barrier to prevent or at least discourage access to the electronic circuit 106 contained within. In alternative embodiments, the enclosure 108 may only provide minimal protection or may not be provided at all.

The illustrated enclosure 108 is depicted in simplified format and may include, for example, a conductive chassis 110 electrically interfaced with a conductive cover 112 such as a door or lid or the like. The chassis 110 and cover 112 are configured such that electrical conductivity is disconnected upon unauthorized access. In addition or in the alternative, a normally-closed switch 114 may be provided and strategically placed such that it is opened upon unauthorized access. In addition or in the alternative, a pair of electrical contacts 116, individually shown as contact C1 and contact C2, may be electrically coupled together and strategically placed such that the contacts C1 and C2 are disconnected from each other upon unauthorized access. The switch 114 and/or the contacts 116 may be provided, for example, on locks, handles latches, hinges, etc., and positioned to open-circuit upon unauthorized access. In addition or in the alternative, at least one conductive trace 118 may be provided on the PCB 107 and configured or positioned to be broken or disconnected upon unauthorized access. Any of these connectivity methods may be included and/or duplicated in different configurations, such as multiple switches, multiple contacts, multiple conductive traces, etc.

In the illustrated embodiment, the IC 102 integrates the continuity tamper detector 104. The IC 102 may be provided as a dedicated tamper device, or may incorporate other primary or secondary circuitry and/or functions of the electronic circuit 106. For example, although not explicitly shown, the IC 102 may include the primary processing functions of the electronic circuit 106 such as including one or more microprocessors, microcontrollers, micro-controller units (MCUs), central processing units (CPUs), etc., or the IC 102 may include measurement functions of a metering device, or the IC 102 may include communication circuitry, such as any type of wired or wireless communications. In other words, the IC 102 may be a dedicated tamper device or the continuity tamper detector 104 may be provided on any one of one or more semiconductor device or ICs of the electronic circuit 106.

As described further herein, the continuity tamper detector 104 monitors the electronic system 100 for tamper detection by monitoring conductivity of selected portions of the electronic system 100. The conductive portions and/or traces are selected or otherwise configured to be disconnected, broken, or otherwise compromised during tampering activities as detected by the continuity tamper detector 104. In the event of tampering detection, the continuity tamper detector 104 generates a tamper signal to control circuitry or the like which may in turn generate a non-maskable interrupt signal or the like to processing circuitry. The processing circuitry may take remedial or corrective action, such as disabling critical functionality, erasing stored content of memory devices, sounding an alarm, sending a tamper message to an authorized entity, etc.

In the illustrated configuration, the continuity tamper detector 104 includes one or more ports for interfacing corresponding parts or portions of the electronic system 100 for tamper detection. As shown, the continuity tamper detector 104 includes 4 ports A, B, C, and D, although it is understood that any number of ports greater than zero may be included. Each of the ports A-D of the continuity tamper detector 104 is coupled to a corresponding pair of pins or pads of the IC 102. As shown, for example, port A interfaces pins 1 and 2, port B interfaces pins 3 and 4, port C interfaces pins 5 and 6, and port D interfaces pins 7 and 8 of the IC 102. Pin 1 is electrically interfaced with the chassis 110 and pin 2 is electrically interfaced with the cover 112 for detecting opening a door or removal of a lid or the like. Pin 3 is coupled to one terminal of the switch 114 and pin 4 is coupled to the other terminal of the switch 114 for detecting when the switch 114 is opened, such as detecting manipulation of a hinge or latch or door or the like. Pin 5 is coupled to the contact C1 and pin 6 is coupled to the contact C2 for detecting if and when the contacts 116 are disconnected from each other, such as detecting manipulation of a hinge or latch or door or the like. Pin 7 is coupled to one end and pin 8 is connected to the other end of the conductive trace 117 for detecting tampering with the PCB 107 or the like.

Figure 2:
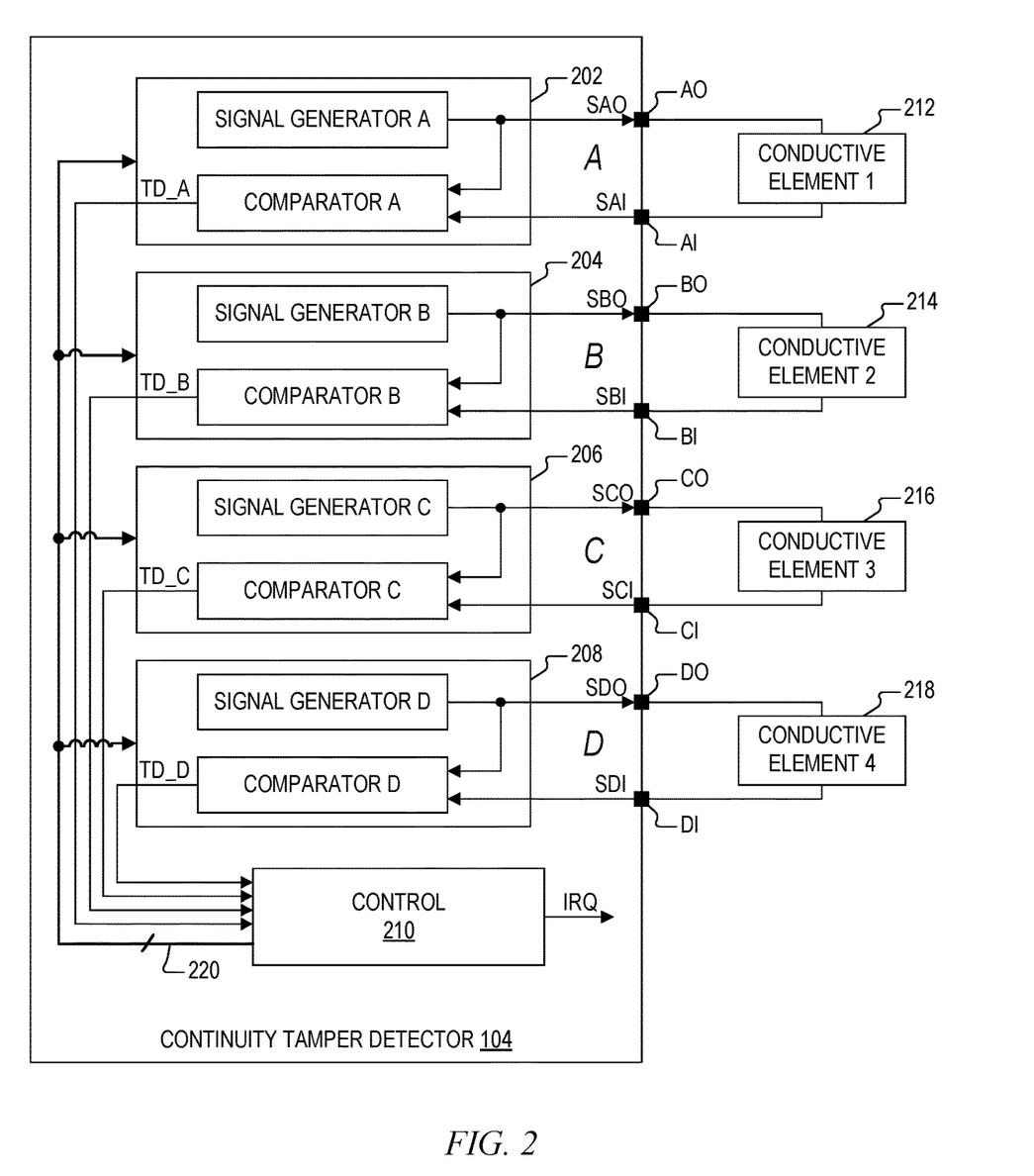
FIG. 2 is a simplified block diagram illustrating further details of the continuity tamper detector of FIG. 1 according to one embodiment of the present disclosure.

FIG. 2 is a simplified block diagram illustrating further details of the continuity tamper detector 104 according to one embodiment of the present disclosure. The continuity tamper detector 104 shown in FIG. 3 includes a first tamper sensor 202 coupled to port A, a second tamper sensor 204 coupled to port B, a third tamper sensor 206 coupled to port C, and a fourth tamper sensor 208 coupled to port D. Although the continuity tamper detector 104 includes 4 ports, the continuity tamper detector 104 may include any other number of port less than or greater than 4. Port A includes an output pad AO and an input pad AI, Port B includes an output pad BO and an input pad BI, Port C includes an output pad CO and an input pad CI, and Port D includes an output pad DO and an input pad DI.

Conductive elements are coupled to each of the ports A-D of the continuity tamper detector 104. As shown, for example, a first conductive element 212 is coupled between pads AO and AI of port A, a second conductive element 214 is coupled between pads BO and BI of port B, a third conductive element 216 is coupled between pads CO and CI of port C, and a fourth conductive element 218 is coupled between pads DO and DI of port D. The first conductive element 212 may represent the combination of the chassis 110 and the cover 112 coupled to pins 1 and 2 of the IC 102, the second conductive element 214 may represent the switch 114 coupled between pins 3 and 4 of the IC 102, the third conductive element 216 may represent the contacts 116 coupled to pins 5 and 6 of the IC 102, and the fourth conductive element 218 may represent the conductive trace 117 coupled between pins 7 and 8 of the IC 102.

Each of the tamper sensors 202, 204, 206, and 208 includes signal generator circuitry and corresponding comparator circuitry for generating and providing a corresponding one of four tamper detect signals TD_A, TD_B, TD_C, and TD_D to the control circuitry 210. The tamper sensor 202 includes signal generator circuitry A providing an output signal SAO to the conductive element 212 via the output pad AO, and comparator circuitry A receives a corresponding input signal SAI via the input pad AI, the tamper sensor 204 includes signal generator circuitry B providing an output signal SBO to the conductive element 214 via the output pad BO, and comparator circuitry B receives a corresponding input signal SBI via the input pad BI, the tamper sensor 206 includes signal generator circuitry C providing an output signal SCO to the conductive element 216 via the output pad CO, and comparator circuitry C receives a corresponding input signal SCI via the input pad CI, and the tamper sensor 208 includes signal generator circuitry D providing an output signal SDO to the conductive element 218 via the output pad DO, and comparator circuitry D receives a corresponding input signal SDI via the input pad DI.

The comparator circuitry of each of the tamper sensors 202, 204, 206, and 208 compares its output signal with its corresponding input signal for determining and providing the corresponding tamper detect signals. The comparator circuitry A compares SAO with SAI for providing TD_A, the comparator circuitry B compares SBO with SBI for providing TD_B, the comparator circuitry C compares SCO with SCI for providing TD_C, and the comparator circuitry D compares SDO with SCI for providing TD_D. In each case, when the input and output signals match, the corresponding tamper detect signal remains de-asserted, such as, for example, de-asserted low. In this manner, as long as the conductive element 212 remains coupled and conductive, then SAO and SAI remain substantially equal so that the comparator circuitry A keeps TD_A de-asserted. When the input and output signals do not match, such as when the corresponding conductive element is no longer present, then corresponding comparator circuitry asserts (e.g., asserts high) the corresponding tamper detect signal. For example, if the conductive element 214 is disconnected or no longer conductive, then SBO and SBI are no longer substantially equal so that the comparator circuitry B asserts TD_B. Operation of each of the tamper sensors 202, 204, 206, and 208 is substantially the same.

It is possible that each of the output signals SAO, SBO, SCO, and SDO could be static or direct-current signals with a selected voltage level. Alternatively, each of the output signals SAO, SBO, SCO, and SDO could be symmetrical period clock signals or the like. Such configurations, however, might be easily monitored and bypassed. In one embodiment, each of the signal generator circuitry A-D are pseudo-random generators that generate and output corresponding pseudo-random signals SAO, SBO, SCO, and SDO. In addition, the pseudo-random signals SAO, SBO, SCO, and SDO are each different from each other further enhancing tamper resistance.

The control circuitry 210 is coupled to each of the tamper sensors 202, 204, 206, and 208 via corresponding control signals 220. The control circuitry 210 may enable and disable or start and stop each of the tamper sensors 202, 204, 206, and 208 during operation. The control circuitry 210 may generate corresponding seed values, such as SEED_A, SEED_B, SEED_C, and SEED_D, for the signal generator circuitry A-D, respectively. The control circuitry 210 may alternatively perform software trigger reloading. The control circuitry 210 may also generate other control signals (not shown) and monitor each of the tamper sensors 202, 204, 206, and 208 via corresponding sense signals or the like (not shown). During operation, when one or more of the tamper detect signals TD_A-TD_B are asserted one or more times, the control circuitry 210 generates an interrupt signal IRQ to inform local or remote processing circuitry of detected tampering of the electronic system 100.

Figure 3:
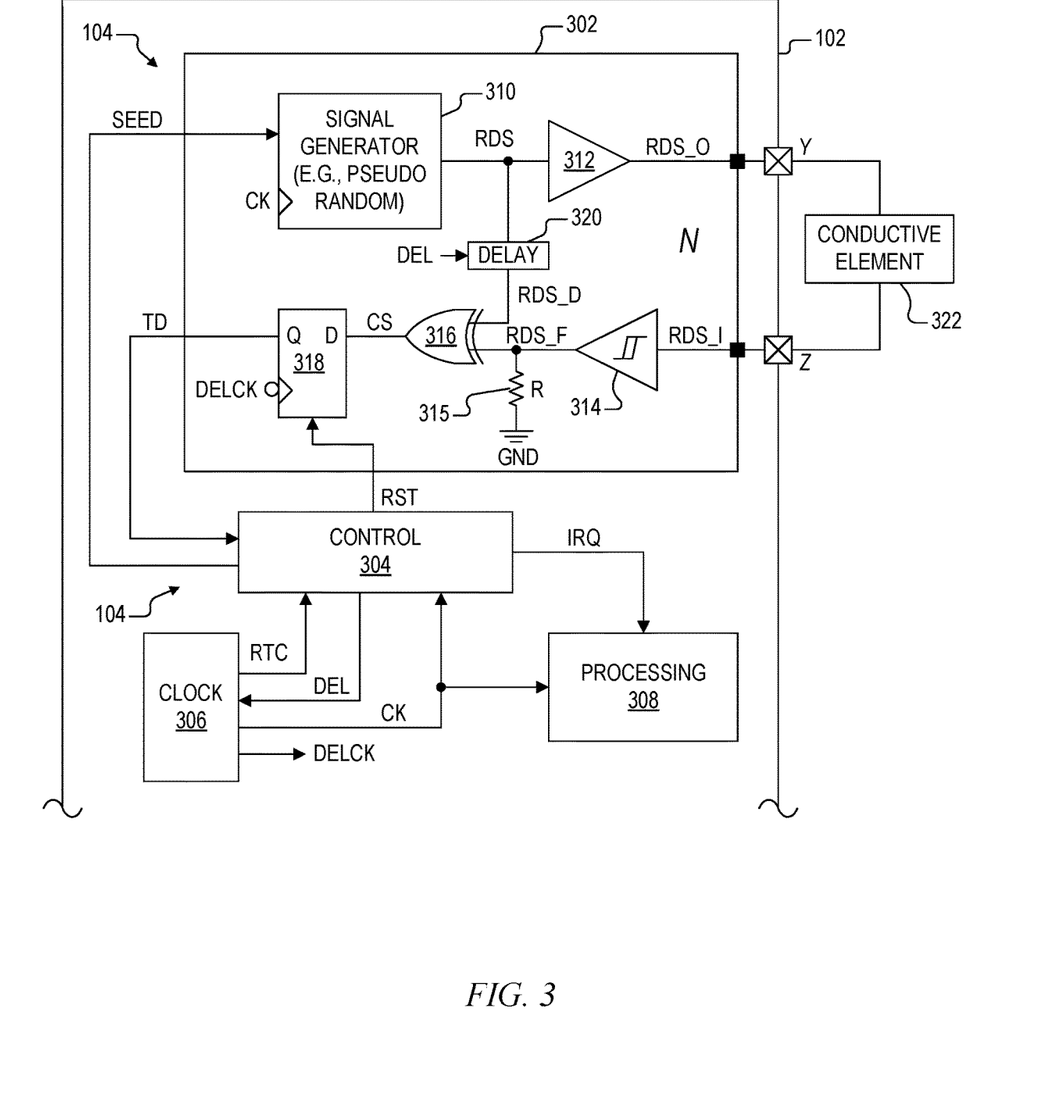
FIG. 3 is a simplified schematic and block diagram of at least a portion of the IC illustrating at least a portion of the continuity tamper detector of FIG. 1 implemented according to one embodiment of the present disclosure.

FIG. 3 is a simplified schematic and block diagram of at least a portion of the IC 102 illustrating at least a portion of the continuity tamper detector 104 implemented according to one embodiment of the present disclosure. The continuity tamper detector 104 includes a tamper sensor 302 for a selected port N, and control circuitry 304. The continuity tamper detector 104 may also include clock circuitry 306 and processing circuitry 308, although the clock circuitry 306 and/or the processing circuitry 308 may be separately provided within the IC 102 or externally on the PCB 107 or the like. The tamper sensor 302 may represent any of the tamper sensors 202, 204, 206, or 208 and port N represents any one or more of the ports A-D of the continuity tamper detector 104 coupled to a corresponding pair of pins Y and Z of the IC 102. The control circuitry 304 may represent the control circuitry 210. Additional tamper sensors (not shown) may be included for interfacing other ports of the continuity tamper detector 104, such as shown in FIG. 2.

The tamper detector 302 includes signal generator circuitry 310, driver or buffer circuitry 312, filter circuitry 314, a 2-input Boolean logic exclusive-OR (XOR) gate 316, a D-type latch or flip-flop (DFF) 318, and delay circuitry 320. The signal generator circuitry 310 generates a pseudo-random signal RDS which is provided to respective inputs of the buffer circuitry 312 and the delay circuitry 320. The buffer circuitry 312 buffers or drives the RDS signal as an output signal RDS_O via the Y pin of port N. The filter circuitry 314 has an input coupled to pin Z for receiving an input signal RDS_I and provides a corresponding filtered signal RDS_F. A pulldown resistor 315 with resistance R is coupled between the output of the filter circuitry 314 and a reference node, such as ground (GND). The delay circuitry 320 is programmed by a delay value DEL to delay the RDS signal and provide a corresponding delayed signal RDS_D. RDS_D and RDS_F are provided to respective inputs of the XOR gate 316, having its output coupled to a D-input of the DFF 318. The non-inverting Q output of the DFF 318 generates a tamper detect signal TD, which is provided to an input of the control circuitry 304. TD represents any of the tamper detect signals of the system, such as TD_A, TD_B, TD_C, and TD_D. A conductive element 322 is shown coupled between pins Y and Z and represents any corresponding one of the external conductive tamper detection devices, such as the enclosure 108, the switch 114, the contacts 116, the conductive trace 118, etc.

The clock circuitry 306 may be configured in any suitable manner for developing one or more clock signals for the IC 102 and/or the continuity tamper detector 104. As shown, the clock circuitry 306 develops a clock signal CK provided to the signal generator circuitry 310, the control circuitry 304, and the processing circuitry 308. The clock circuitry 306 may also be configured to generate a real-time clock (RTC) signal shown provided to the control circuitry 304. The RTC signal may include time stamp information or the like for identifying specific dates and times for each assertion of the TD signal. The control circuitry 304 determines the DEL value as further described herein and then provides the DEL value to the clock circuitry 306 and to program the delay circuitry 320. The clock circuitry uses the DEL value to provide a delayed clock signal DELCK to the clock input of the DFF 318 for purposes of synchronization as further described herein. The control circuitry 304 provides a reset signal RST to the DFF 318 to reset the TD signal. The control circuitry 304 detects one or more assertions of the TD signal to detect or determine tampering or a tamper event, and generates a corresponding interrupt signal IRQ to the processing circuitry 308.

The signal generator circuitry 310 may be implemented in any suitable manner to provide the RDS signal, such as a pseudo-random binary sequence generator, a linear-feedback shift register with software triggered reloading, etc. Any type of generator that provides a pseudo-random digital signal is contemplated. The signal generator circuitry 310 may generate a digital signal with pseudo-random pulses or pseudo-random delays between consecutive pulses. The SEED value provided by the control circuitry 304 may be randomly generated to enhance tamper protection.

General operation of the continuity tamper detector 104 is now described. The control circuitry 304 initially controls operation of the tamper detector 302 as further described herein to determine any delay between the RDS signal and the RDS_F signal and determines DEL for programming the delay circuitry 320 accordingly. DEL is also provided to the clock circuitry 306 for delaying DELCK relative to CK. The control circuitry 304 provides a SEED value to the signal generator circuitry 310 and then initiates the signal generator circuitry 310 to output the pseudo-random signal RDS signal. The RDS signal is amplified or otherwise buffered by the buffer circuitry 312 for providing the RDS_O output signal from pin Y (or output pin) to the conductive element 322. Assuming that the conductive element 322 is coupled to the pins Y and Z and conductive, the RDS_O output signal is fed back as the RDS_I input signal receive via the Z input pin (or input pin). The filter circuitry 314 may be configured as a Schmitt trigger device with hysteresis to filter out spurious fluctuations of RDS_I and for providing the filtered input signal RDS_F. The filter circuitry 314 drives RDS_F to follow RDS_I unless its input becomes non-driven or open-circuited, in which case RDS_F is pulled low by the resistor 315.

The delay circuitry 320 delays RDS by a corresponding delay amount from the input of the buffer circuitry 312 to the output of the filter circuitry 314 and provides the RDS_D signal as the delayed version of the RDS signal to synchronize timing with the RDS_F signal. The delay circuitry 320 is thus programmed to reduce or minimize any timing difference between RDS_D and RDS_F, although minor delay variations may occur. The XOR gate 316 compares RDS_D with RDS_F and provides a comparison signal CS to the D input of the DFF 318. The CS may exhibit temporary fluctuations during signal transitions when there are small timing differences between RDS_D and RDS_F. The DFF 318, however, is clocked by an inverted version of DELCK which is delayed relative to CK by about the same delay of the delay circuitry 320. In this manner, as long as any timing difference between RDS_D and RDS_F is less than about half the cycle of DELCK, the CS signal should be stable at negative transitions of DELCK to avoid or minimize false tamper detections.

Assuming the conductive element 322 is present and conductive indicating non-tampering of the electronic system 100, TD remains de-asserted low. Upon tampering of the electronic system 100 such that the conductive element 322 is removed, damaged or otherwise open-circuited, however, then RDS_F remains pulled low by the resistor 315. When RDS_D is next asserted high for at least one cycle of DELCK, CS is asserted high and remains high so that the DFF 318 asserts TD high. In one embodiment, the control circuitry 304 may be configured to immediately assert the interrupt signal IRQ to the processing circuitry 308 upon assertion of TD. In another embodiment, the control circuitry 304 may be configured to statistically monitor multiple assertions of TD over time before asserting IRQ.

The processing circuitry 308 may be configured for low power operation including a sleep mode or the like. The tamper sensor 302 and the control circuitry 304 may remain at least partially active for monitoring for tampering events during the sleep mode of the processing circuitry 308. Upon receiving IRQ, the processing circuitry 308 wakes up from its sleep mode (if in sleep mode) and performs any remedial or corrective action, such as disabling critical functionality, erasing stored content of memory devices, sounding an alarm, sending a tamper message to an authorized entity, etc.

In an alternative embodiment, the delay circuitry 320 and the DELCK may be omitted in which case the DFF 318 is clocked by CK. In this case, the frequency of CK and the consecutive transitions of RDS are sufficiently separated in time relative to CK to ensure that RDS_F settles in response to transitions of RDS by the next operative transition of CK (e.g., falling edges of CK) clocking the DFF 318.

Figure 4:
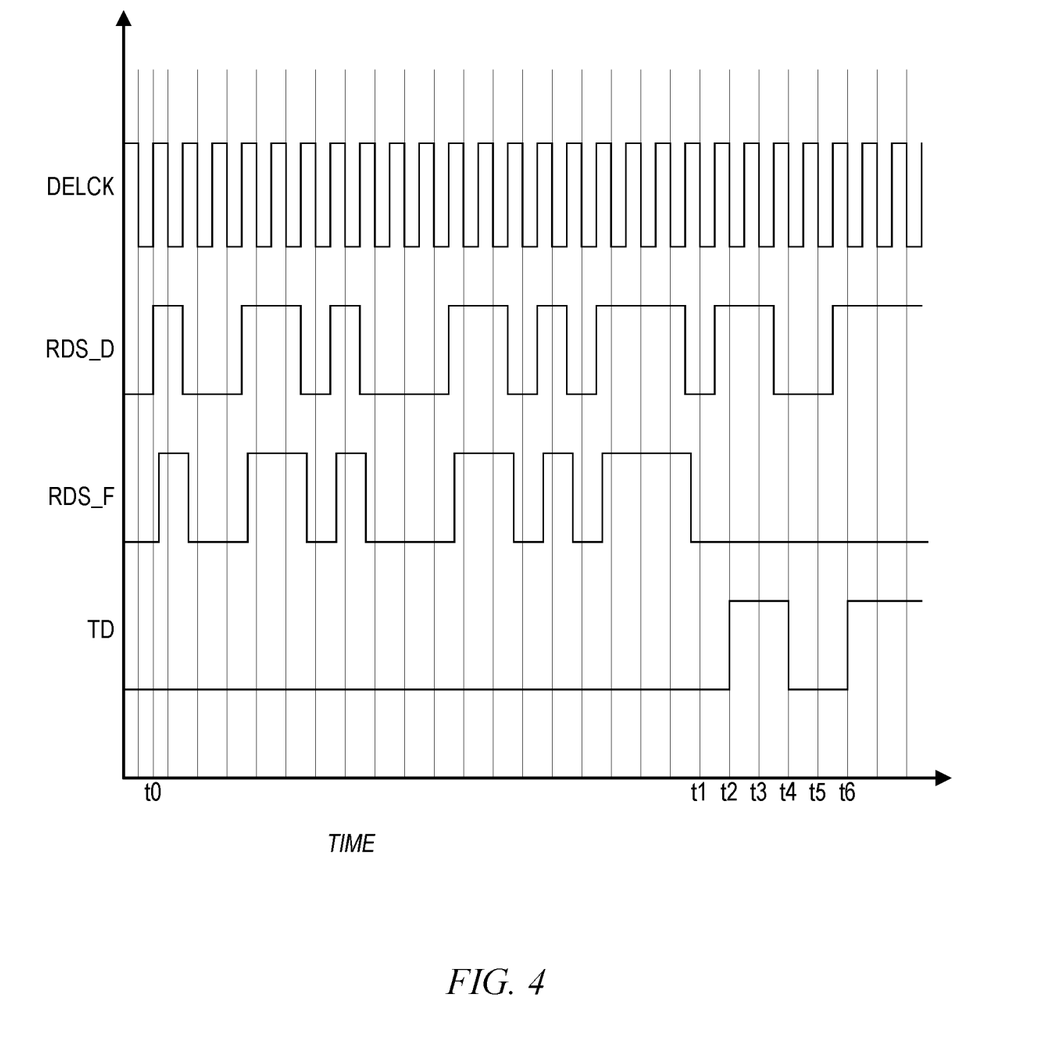
FIG. 4 is a timing diagram illustrating operation of the continuity tamper detector of FIG. 3 according to one embodiment of the present disclosure.

FIG. 4 is a timing diagram illustrating operation of the continuity tamper detector 104 configured according to that shown in FIG. 3 according to one embodiment of the present disclosure. The signals DELCK, RDS_D, RDS_F, and TD are plotted versus time. DELCK toggles at a selected frequency and may have about a 50% duty cycle as shown. The signals DELCK and RDS_D are delayed by the same amount with respect to CK, so that transitions of RDS_D are essentially synchronized with each other. The RDS_D signal, however, is toggled in a pseudo-random manner by the signal generator circuitry 310. The RDS_F signal follows the RDS_D signal with a slight timing difference. As shown at an initial time t0, for example, when RDS_D goes high, the RDS_F goes high with a slight delay. The slight delay is emphasized or slightly enlarged for purposes of illustration. The timing circuitry 320 and the DEL values may be configured to minimize delay between RDS_D and RDS_F. Although not shown, the CS signal may fluctuate with transitions of the RDS_D and RDS_F signals. This slight delay is inconsequential, however, so long as the RDS_D and RDS_F signals stabilize at the falling edges of DELCK so that the TD signal remains de-asserted low as shown while the conductive element 322 remains untouched.

At a subsequent time t1, a tamper event occurs in which the conductive element 322 is removed, broken, or otherwise disconnected. At this time, RDS_F is pulled low by the resistor 315. At subsequent time t2 when DELCK next goes low, RDS_D and RDS_F are sampled at different states so that the TD signal goes high. The TD signal remains high at time t3 when the RDS_D and RDS_F are again sampled at different states. The TD signal is low at subsequent times t4 and t5 when the RDS_D and RDS_F signals are sampled at the same logic states, but TD goes high again at subsequent time t6. Operation continues in this manner in which the TD signal toggles while the conductive element 322 is not present. As previously described, the control circuitry 304 may be configured to assert IRQ as soon as TD is sampled high. Alternatively, the control circuitry 304 may assert IRQ when TD is sampled high a programmed number of times. The control circuitry 304 may also sample the RTC signal to record a timestamp value each time TD is sampled high.

The pseudo-random signal RDS_D is shown with random transitions with randomly distributed pulses and pulse widths. In an alternative embodiment, the pseudo-random signal may be a digital signal with random delays between pulses. The pulses thus may be randomly distributed over time. The pulses may have uniform durations or may also have random durations.

Figure 5:
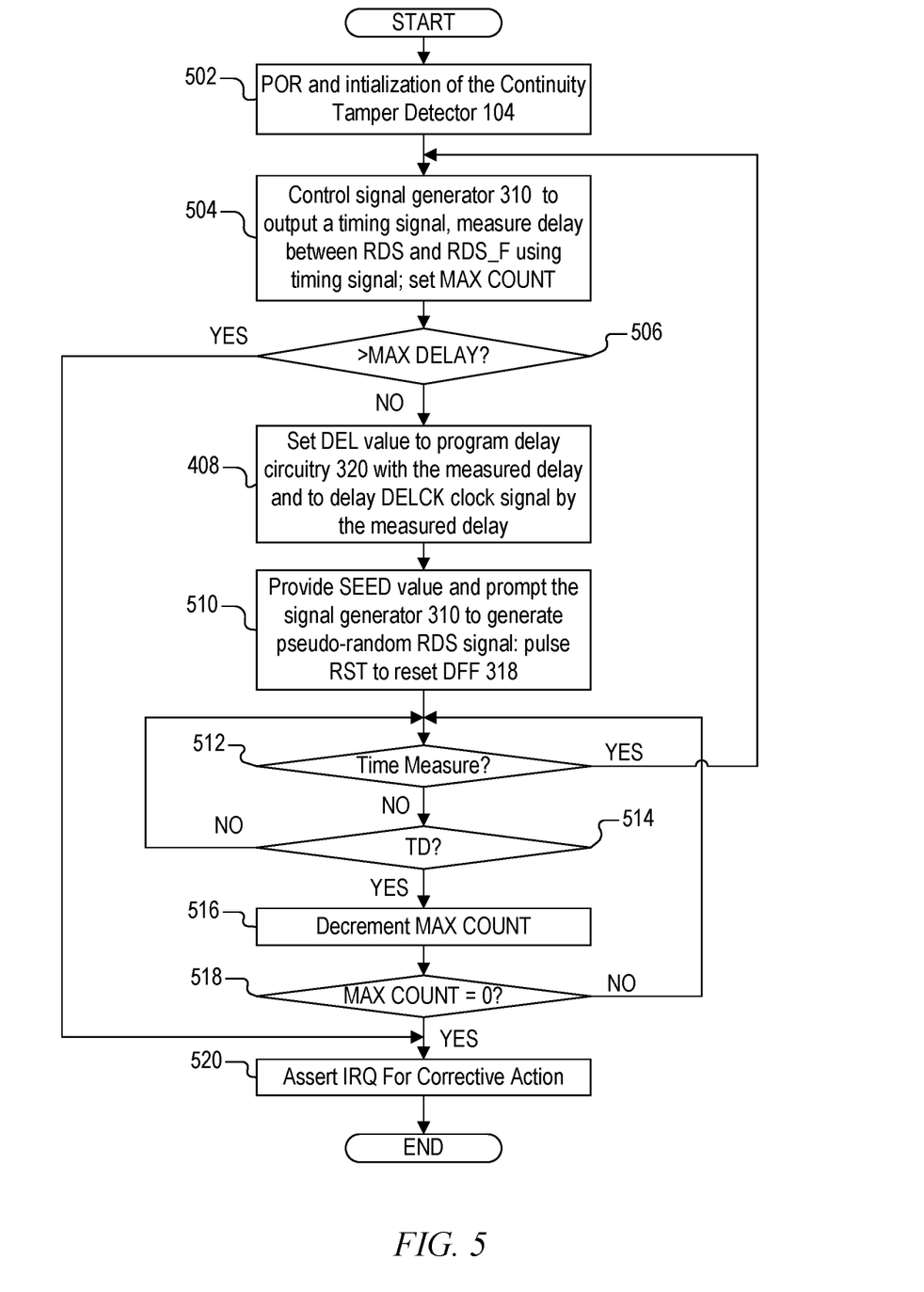
FIG. 5 is a flowchart diagram illustrating operation of the continuity tamper detector of FIG. 3 according to one embodiment of the present disclosure.

FIG. 5 is a flowchart diagram illustrating operation of the continuity tamper detector 104 configured according to that shown in FIG. 3 according to one embodiment of the present disclosure. At a first block 502, the IC 102 is powered up or reset (POR) and the IC 102 and the continuity tamper detector 104 are initialized. At next block 504, the control circuitry 304 performs a time measurement in which it controls the signal generator circuitry 310 to output a timing signal to measure a delay between RDS and RDS_F. The timing signal is not a pseudo-random signal but instead is may be a periodic clock signal or the like output as RDS_O, fed through the conductive element 322 and the filter circuitry 314 and provided as the RDS_F signal. In this manner, the control circuitry 304 measures any delay from RDS to RDS_F. In addition, a MAX COUNT value is set at block 504, described further herein.

At next block 506, it is queried whether the measured delay is greater than a pre-programmed or predetermined MAX DELAY value (e.g., >MAX DELAY). If not, then operation advances to block 408 in which the control circuitry 304 sets the DEL value to program the delay circuitry 320 and to delay the DELCK clock signal by the measured delay. Delay measurement may be performed in any suitable manner, such as using a timer or the like (not shown). At next block 510, the control circuitry 304 provides a SEED value and prompts the signal generator circuitry 310 to generate RDS as a corresponding pseudo-random signal. The control circuitry 304 also may pulse the RST signal to reset the DFF 318 to ensure that TD is initialized low.

At next block 512, it is queried whether to perform another time measurement to update DEL. If not, operation advances to block 514 to query whether the TD signal has been asserted. If not, operation loops between blocks 512 and 514 until either another time measurement is to be made, or until TD is asserted. The time measurement is used to synchronize the RDS_F and RDS_D signals by determining and/or updating DEL and programming the delay circuitry 320 accordingly. Over time and any temperature changes, the delay may change so that another time measurement may be warranted. When another time measurement is to be made as determined at block 512, operation loops back to block 504. The time measurement may be performed on a period basis to ensure that the delay remains reasonably accurate.

When TD is detected asserted at block 514, operation advance to block 516 to decrement the MAX COUNT value. The MAX COUNT value may simply be set to one such that a tamper event is assumed upon first assertion of the TD signal. Alternatively, the MAX COUNT value is set to a value greater than one and decremented each time TD is detected asserted. Operation then advances to block 518 to query whether MAX COUNT has been decremented to zero (0). If not, operation loops back to block 512 to continue monitoring the TD signal. When MAX COUNT is decremented to zero as determined at block 518, operation advances to block 520 in which the control circuitry 304 asserts the IRQ circuitry to wakeup or otherwise inform the processing circuitry 308 that a tamper event has been detected. The processing circuitry 308 may then take corrective or remedial action as previously described.

Referring back to block 506, if the measure delay exceeds the MAX DELAY value, then it is determined that the conductive element 322 is either not present or has been tampered with, and operation advances instead directly to block 520 to assert IRQ and interrupt the processing circuitry 308.

In an alternative embodiment in which the delay circuitry 320 is not provided and DFF 318 is clocked by CK instead of DELCK, then a simple continuity test may instead be performed at block 504 to determine the presence of the conductive element 322. If not present, then at block 506 operation may advance directly to block 520 to assert the IRQ signal to take any corrective action. Also, block 408 is omitted and operation instead advances to block 510, and the inquiry at block 512 is also omitted. Otherwise, operation is substantially similar.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. An integrated circuit, comprising:
   an input terminal and an output terminal;
   a signal generator circuitry that generates a pseudo-random digital signal provided at the output terminal;
   a delay circuitry having an input receiving the pseudo-random digital signal provided by the signal generator circuitry and having an output providing a delayed pseudo-random digital signal;
   a control circuitry that measures a delay between the output of the signal generator circuitry and an input signal received via the input terminal and that programs the delay circuitry accordingly; and
   a comparator circuitry that compares the input signal received via the input terminal with the delayed pseudo-random digital signal and that provides a tamper detection signal in response to the comparison.

2. The integrated circuit of claim 1, wherein the signal generator circuitry comprises a pseudo-random binary sequence generator.

3. The integrated circuit of claim 1, wherein the signal generator circuitry comprises a linear-feedback shift register with software triggered reloading.

4. The integrated circuit of claim 1, wherein the pseudo-random digital signal comprises a digital signal with pseudo-random delays between pulses.

5. The integrated circuit of claim 1, wherein the comparator circuitry comprises a Boolean logic exclusive-OR gate having a first input receiving the pseudo-random digital signal, having a second input receiving the input signal, and having an output providing the detection signal.

6. The integrated circuit of claim 1, further comprising: buffer circuitry having an input receiving the pseudo-random digital signal provided by the signal generator circuitry and having an output providing a corresponding buffered pseudo-random digital signal at the output terminal; and filter circuitry having an input coupled to the input terminal and having an output providing the input signal comprising a filtered input signal; wherein the comparator circuitry comprises: a Boolean logic exclusive-OR gate having a first input receiving the delayed pseudo-random digital signal, having a second input receiving the filtered input signal, and having an output providing a comparison signal; and a flip-flop having an input receiving the comparison signal and having an output providing the tamper detection signal.

7. The integrated circuit of claim 6, wherein the delay circuitry inserts a delay representing a delay from the input of the buffer circuitry to the output of the filter circuitry, and wherein the flip-flop is clocked by a delay clock.

8. The integrated circuit of claim 7, wherein the control circuitry measures a delay between the output of the signal generator circuitry and the output of the filter circuitry and programs the delay circuitry accordingly.

9. The integrated circuit of claim 8, further comprising clock circuitry that provides the delay clock that is delayed by the measured delay.

10. The integrated circuit of claim 1, further comprising: interrupt circuitry that provides an interrupt when the tamper detection signal is provided; and processing circuitry that performs correction action in response to the interrupt.

11. A method of detecting tampering, comprising:
generating and providing a pseudo-random digital signal at an output terminal;
delaying the pseudo-random digital signal and providing a delayed pseudo-random digital signal;
measuring a delay between the generated pseudo-random digital signal and an input signal received via an input terminal and programming the delay circuitry accordingly; and
comparing the input signal received via the input terminal with the delayed pseudo-random digital signal to generate a tamper detection signal in response to the comparing.

12. The method of claim 11, wherein the generating comprises providing a pseudo-random binary sequence.

13. The method of claim 11, wherein the generating comprises software trigger reloading of a linear-feedback shift register.

14. The method of claim 11, wherein the generating comprises providing a digital signal with pseudo-random delays between pulses.

15. The method of claim 11, wherein the comparing comprises performing an exclusive-OR Boolean function between the pseudo-random digital signal and the input signal and providing a comparison signal.

16. The method of claim 11, further comprising: buffering the pseudo-random digital signal provided by the signal generator circuitry and providing a corresponding buffered pseudo-random digital signal at the output terminal; and filtering a signal received at the input terminal and providing the input signal as a filtered input signal; wherein the comparing comprises: performing an exclusive-OR Boolean function between the pseudo-random digital signal and the filtered input signal and providing a comparison signal; and latching the comparison signal for providing the tamper detection signal.

17. The method of claim 16, wherein the performing an exclusive-OR Boolean function comprises performing an exclusive-OR Boolean function between the delayed pseudo-random digital signal and the filtered input signal.

18. The method of claim 17, wherein the measuring a delay and the programming comprises measuring a delay between the pseudo-random digital signal and the filtered input signal and programming the delay circuitry accordingly.

19. The method of claim 18, further comprising delaying the latching of the comparison signal by the measured delay.

20. The method of claim 11, further comprising: providing an interrupt when the tamper detection signal is provided; and performing correction action in response to the interrupt.

\* \* \* \* \*